Patented Feb. 4, 1941

2,230,972

UNITED STATES PATENT OFFICE 2,230,972

RECOVERY OF ANTIMONY AND TIN COMPOUNDS FROM THEIR ORES

Stephen E. Erickson, Springdale, Conn., and Arvid E. Anderson, Cornwall, Pa., assignors to American Cyanamid Company, New York, N. Y., a corporation of Maine No Drawing. Application July 12, 1939, Serial No. 283,968

4 Claims. (Cl. 75—121)

This invention relates to a process for recovering compounds of antimony and tin from their ores, and more particularly from refractory ores which are not amenable to the ordinary metallurgical methods.

It is well known that roasted ores containing antimony and tin can be treated by leaching and precipitation but this process is not applicable to ores in which antimony or tin compounds are present in a refractory form.

It has been proposed in the past to heat tin ores with sulfur compounds in the absence of alkali metal salts. This produces a sulfide of tin and under suitable conditions stannous sulfide which is insoluble in water and can only be removed by treatment with special solvents such as strong solutions of polysulfides, acids, and the like. It was not possible with such a process to use a cheap material such as water for leaching and accordingly, the process has not achieved wide-spread use.

According to the present invention, ores containing antimony or tin are subjected to a reducing roast using a carbonaceous reducing agent in the presence of an alkali metal compound and if necessary, sulfur. The treatment appears to transform antimony and tin compounds into soluble polysulfides which can be removed by leaching in water and precipitating by acid or electrolysis.

The present invention is not only applicable to the recovery of ores which contain antimony and tin as their main constituents but is also effective in the treatment of ores in which these metals appear as undesirable impurities, for example, certain precious metal ores. These ores are frequently treated by roasting processes which produce a fume containing valuable compounds of antimony and tin but in many cases, the pollution of the air which results is so great a nuisance that the process cannot be used and is therefore restricted to certain regions which are far removed from centers of population. The present invention effectively removes the antimony or tin without rendering the rest of the ore refractory to the ordinary treatment for the recovery of precious metals, such as cyanidation and the like. In the case of such ores, the present invention possesses an additional advantage that the antimony and tin impurities can be recovered in a marketable form and do not have to be wasted into the atmosphere.

The nature of the alkali metal compound will vary and the invention is not limited to the use of any particular compound, provided that the roast is sufficiently basic to produce the soluble polysulfides. In the case of ores which contain a large amount of sulfur, the addition of sulfur may be entirely or partially omitted. The use of an alkali metal salt, such as sodium sulfide, which supplies both the basic metal and the sulfur is also included.

The invention will be described in detail in conjunction with specific examples which illustrate typical applications but are not intended to limit the invention. The parts are by weight.

Example 1

An ore assaying 10.27% antimony, present as oxides, was crushed to —20 mesh and roasted for 30 minutes at 1400° F. with 10% by weight of each of sulfur and soda ash and 2½% by weight of coal. The roasted ore was quenched in water, boiled and filtered. The filtrate contained 76.3% of the antimony which was removed in the usual manner by precipitation.

Example 2

The ore of Example 1 was roasted as described in Example 1 but instead of 10% each by weight of sulfur and soda ash, 15% was used. The recovery of antimony was 81.2%.

Example 3

The ore of Example 1 was treated with an amount of sodium sulfide equivalent to 15% each of soda ash and sulfur. Recoveries of antimony were substantially the same as in Example 2.

What we claim is:

1. A method of recovering metal values from an oxide ore containing a metal included in the group consisting of antimony and tin which comprises adding soda ash and sulfur and subjecting the mixture to an anhydrous reducing roast at a high temperature, leaching the ore in water to remove the soluble polysulfides formed and recovering the metal values by precipitation.

2. A method according to claim 1 in which the weights of soda ash and sulfur were each not less than the weights of the oxides of the metal values in the ore.

3. A method of recovering metal values from an oxide ore containing a metal included in the group consisting of antimony and tin which comprises adding an alkali metal compound, an unoxidized sulfur-bearing material and at least sufficient carbonaceous reducing agent to combine with the oxygen of the antimony and tin oxide in the ore and subjecting the mixture to an anhydrous reducing roast at high temperature, leaching the ore in water to remove the soluble poly sulfides formed and recovering the metal values by precipitation.

4. A method of recovering metal values from an oxide ore containing a metal included in the group consisting of antimony and tin which comprises adding soda ash and sulfur and at least sufficient carbonaceous reducing agent to combine with the oxygen of the antimony and tin oxide in the ore and subjecting the mixture to an anhydrous reducing roast at high temperature, leaching the ore in water to remove the soluble polysulfides formed and recovering the metal values by precipitation.

STEPHEN E. ERICKSON.
ARVID E. ANDERSON.